May 1, 1962 L. S. AUER 3,031,742
HIGH PRESSURE RECIPROCATING RETRIEVER APPARATUS
Filed March 15, 1960 2 Sheets-Sheet 1
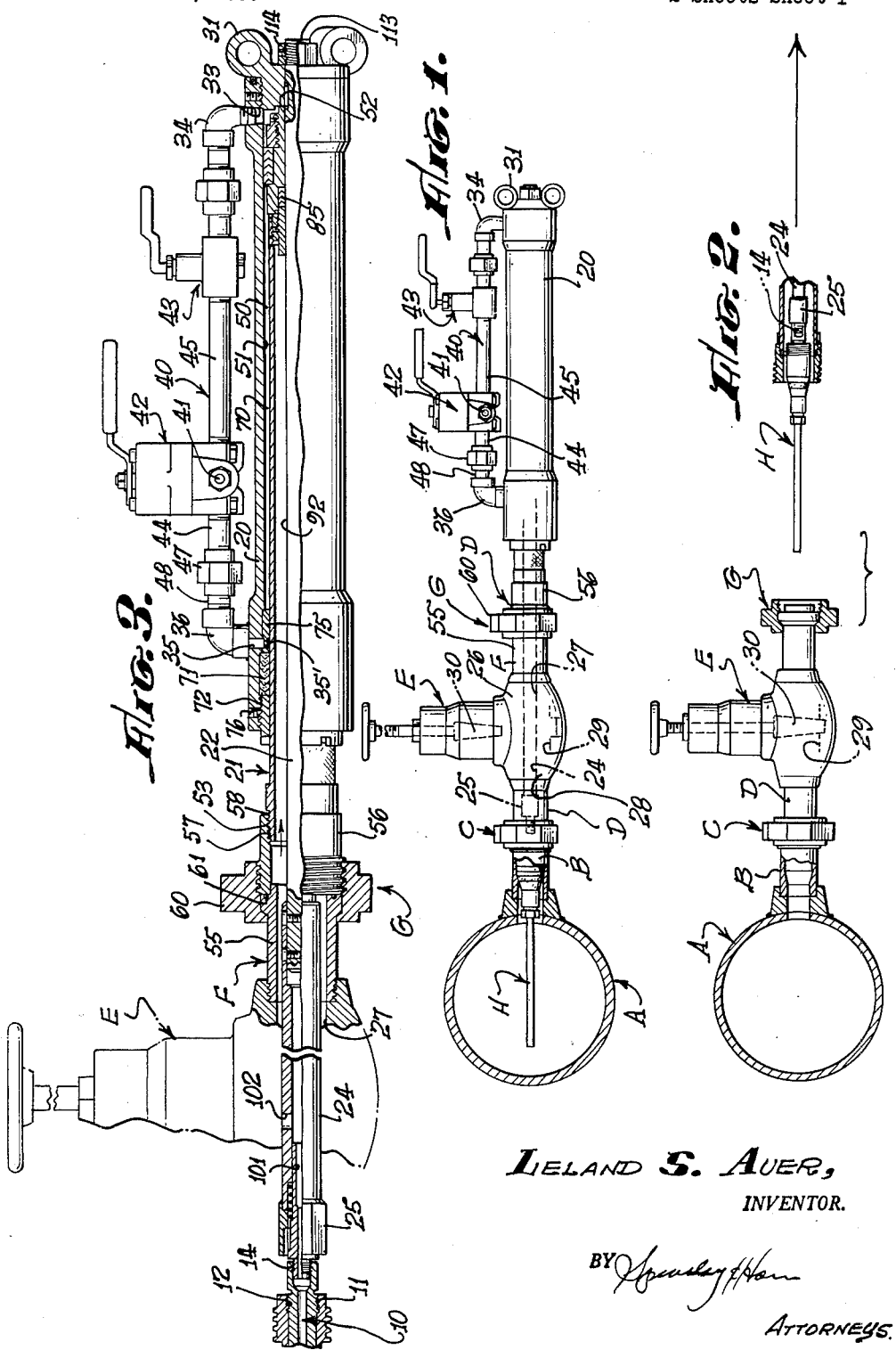
Leland S. Auer,
INVENTOR.
BY
ATTORNEYS.

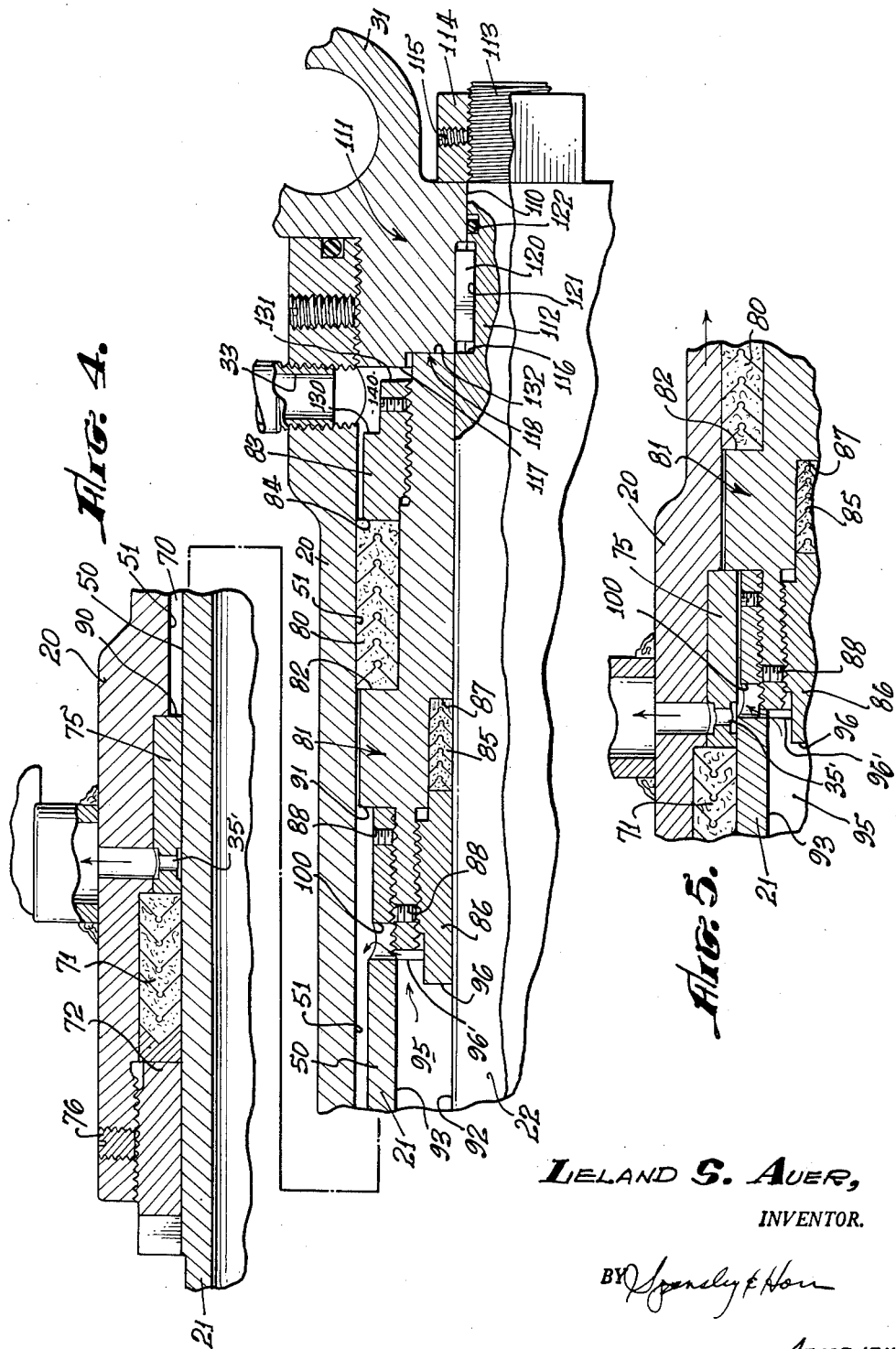

United States Patent Office 3,031,742
Patented May 1, 1962

3,031,742
HIGH PRESSURE RECIPROCATING RETRIEVER APPARATUS
Leland S. Auer, Sherman Oaks, Calif., assignor to Grant Oil Tool Company, Los Angeles, Calif., a corporation of California
Filed Mar. 15, 1960, Ser. No. 15,166
7 Claims. (Cl. 29—213)

This invention relates to apparatus for the operation, installation and removal of fittings in pressure vessels, and more particularly to an improved retriever tool for handling such fittings under pressure.

In many applications fittings for various purposes are used in pressure vessels, such as in well heads for oil wells. These fittings, such as, for example, those disclosed in United States Patents Nos. 2,752,228 and 2,804,279, can be installed in and removed from such pressure vessels while under pressures of the order of several thousand pounds per square inch by means of tools known to the prior art as retrievers. One such retriever tool is disclosed and claimed in United States Patent No. 2,744,310 titled Apparatus for Handling a Fitting under Pressure, issued September 17, 1951 to Jay P. Gould. Such apparatus is useful generally where fluid under pressure is being handled and the device is particularly useful in situations where operations, such as flow gaging, are to be selectively performed within the pressurized volume of the vessel. An oil well where a casing is normally under pressure and is provided with a head presents a typical application in which the invention of the present application can be used to advantage and such an application will therefore be described as an illustrative example of the utility and operation of the present apparatus. Retrievers heretofore known to the art have operated in general by attaching a retriever to a valve and operating the retriever to extend through the valve and through a nipple to the fitting to be operated or handled. Thus, in a typical installation an access fitting such as that described in Patent No. 2,804,279 is installed through the wall of the pressure vessel such as the production tubing of an oil well. The access plug is a fitting which is removable for access to the interior of the pressure vessel. Briefly, the access plug comprises a cylindrical body portion with the tapered seat near its inner end and is provided with threads at its outer end. The fitting is also provided with a head portion on its outer end, the head portion in this instance having a hexagon shape for engagement by a socket wrench or the like. The fitting is mounted in a tubular nipple that is internally threaded at its outer end for mating cooperation with the threads on the fitting and has a tapered seat for cooperation with the seat on the fittings to provide a seal against fluid flow therebetween. The fitting is provided with an internal passage that is opened when the tapered seat of the fitting is raised from the tapered seat of the nipple. The passage in the fitting includes an axial bore in the head portion, which bore is conventionally provided with internal threads. The passage provides flow communication from the interior of the pressure vessel through the nipple to the outside when the seat of the fitting is raised from the seat of the nipple. It will be understood that the fitting can be installed and removed from the nipple even under pressure by a tool in accordance with the present invention. Such a tool includes an operating rod which is extended through a valve which is connected at the outer end of the nipple and beyond the access plug such that the fluid passage from the vessel can be closed by the valve when the access fitting is not in position or is in an open condition.

The retriever with which the present invention is concerned is utilized to be attached at the outer side of the valve to form a closed fluid path exteriorly of the valve such that when the valve is open and the access fitting is removed, fluid cannot escape from the pressure vessel and is confined by the retriever. Retrievers such as that disclosed and claimed in Patent No. 2,744,310 are pressure balanced in that regardless of the position of the retriever in relation to its stroke for the removal of the fitting, the pressure areas at the various locations in the retriever remain in a pressure balanced condition. Such pressure balancing is effective both in extending the retriever and in collapsing it. In order to operate the retriever it is necessary that the operating rod thereof be extended through the valve and retracted therefrom after engagement with the fitting. In several types of operaions physical conditions occur which make it difficult for one man to be able to extend the retriever in a vertical position without additional help. Under high pressure operations considerable friction is created within the retriever by the expansion of various packing units. Thus, although the pressure may be balanced at both sides of the parts of the retriever which must be moved, the friction of the parts within the retriever itself will sometimes cause the operation of the retriever to be difficult. In some areas davits have been constructed over the access fitting site in order to assist in the elevation of the retriever. Other applications make use of temporary and unsubstantial mechanical aids such as chain hoists and the like.

Accordingly, it is an object of the present invention to provide a retrieving apparatus of the type discussed which includes means for assisting the operator of the tool in extending or collapsing the tool under high pressure conditions.

It is another object of the present invention to utilize the pressure within the fluid as a means for furnishing a pressure assist in the collapsing or the extending of the retrieving apparatus.

Still another object of the present invention is to provide such an assist which does not materially add to the cost of the retriever and which can be operated efficiently and economically.

A further object of the present invention is to provide an improved apparatus for operating, installing and removing threaded fittings in pressure vessels, which apparatus utilizes the pressures existing in the vessel as an assist in operation of the apparatus.

The present invention provides an improved retrieving apparatus including an outer barrel, an inner barrel longitudinally movable within the outer barrel, and a mandrel affixed to the outer barrel and movable therewith. The mandrel extends through the inner barrel and is adapted at the outer end of the mandrel to engage a fitting to be moved or retrieved. Pressure areas are provided to obtain relative movement between the inner and outer barrels in response to fluid pressure upon said areas. A fluid circuit with suitable valving is provided to direct fluid pressure admitted to the retriever to the desired pressure area for the movement in the predetermined direction.

The novel features which are believed to be characteristic of the present invention, together with further objects and advantages thereof, will be better understood from the following description considered in connection with the accompanying drawing in which several embodiments of the method of the present invention are illustrated by way of example. It is to be expressly understood, however, that the drawings are for the purpose of illustration and example only and are not intended as a definition of the limits of the invention.

In the drawing:

FIGURE 1 is a view in elevation of a retriever in accordance with the present invention utilized with a typical installation and with the retriever in the collapsed position extending through the flow control valve;

FIGURE 2 is a view in elevation and partly in section, showing the operating end of the retriever removed from the high pressure vessel with the flow control valve maintaining the pressure within the vessel;

FIGURE 3 is a view of the presently preferred embodiment of the present invention shown in detail and partly in section when in the collapsed position in which the retriever is in engagement with the fitting mounted at the wall of the pressure vessel;

FIGURE 4 is an enlarged partial view in section showing the construction of the apparatus with the apparatus in the extended position; and FIGURE 5 is a view corresponding partially to FIGURE 4 showing the components in the collapsed position of the apparatus.

Referring now to the drawings, there is shown a presently preferred embodiment of the present invention as utilized in the removal of a fitting from a pressure vessel. An oil well, where a casing is normally under pressure, presents a typical application in which the invention can be used to advantage, and accordingly the following description will be presented in connection with such an application of the device. It will be understood that this particular application of the invention is illustrative only and that the broad aspects of the invention are to be in no way considered or construed as limited thereby.

In the drawings, for purpose of example, a well casing A is shown equipped with a nipple B into which an access plug as previously described is fitted for pressure access to the interior volume of the vessel. At the exterior end of the nipple B a union C is affixed with a second nipple D extending outwardly therefrom and attached in fluid connection with a flow control valve of the conventional and well-known type. At the outer end of the valve suitable fittings such as a nipple F and a female threaded union G are provided for fitting and attaching a retriever in accordance with the present invention. An access plug as previously described is positioned within the nipple B and is shown with an instrument rod H attached thereto as an illustrative example of the type of fitting which would be removed from the well casing A. The access plug, which forms no part of the present invention, includes an inner plug member 10 which carries the instrument rod H and is removed from the stationary part of the access fitting by rotating the inner plug 10 to disengage the male threads 11 thereof from the female threads of the access fitting member. Internal threads 14 are provided on the inner surface of the plug member 10 which is to be removed. Thus, it can be seen that in order to remove such a member it is necessary to insert a male threaded retrieving tip into the female threads 14 of the access plug with a hex wrench formed on the retrieving tip to rotate the access plug member 10 from the female threads 12, after which it can be withdrawn from the access fitting. The present invention is an improved retrieving device for carrying out this operation through the control valve E, as will become more apparent hereinafter in connection with the construction and operation of the present invention.

A retriever in accordance with the present invention comprises in general an outer barrel 20, an inner barrel 21 longitudinally movable within the outer barrel 20, and a mandrel 22 affixed to the outer barrel 20 and movable therewith. The mandrel 22 carries at the outer end thereof a pilot rod 24 which is adapted to extend through the service valve E and carry a retrieving tip and wrench 25 which is in turn adapted to engage the fitting to be removed from the pressure vessel, which in the illustrative embodiment is an excess fitting 10 connected or inserted into an oil well casing A.

Referring now particularly to FIGURES 1, 2 and 3, the service valve E may be any of the high-pressure valves known to the art in which the valving mechanism is withdrawn from the valve body, or is otherwise oriented, to present an axial opening through the valve. For example, in the embodiment shown a gate valve is used which has a body 26 with openings 27 and 28 in diametrically opposite sides thereof with a central plug opening 29 which is in communication with the openings 27 and 28. The gate 30 of the valve is movable into and out of the passage 29 by threading the gate upward or downward in the figures from an upper open position to a lower closed position. At the upper, or open, position the gate is completely removed from the flow passage such that the pilot rod 24 of the retrieving apparatus can be extended through the valve without interference.

The outer barrel 20 of the retriever is a generally elongate cylindrical body of predetermined length and predetermined inside diameter as more fully discussed hereinafter. Handling means 31 are provided at the outer end of the outer barrel in order that the tool can be manually handled or rotated, or can be lifted by suitable apparatus. Proximate the outer end of the outer barrel a fluid flow port 33 is provided and is threaded to receive suitable fittings such as an elbow 34. Similarly, a fluid flow port 35 is provided proximate the inner end of the barrel and is adapted to accommodate suitable fluid flow fittings such as an elbow 36. A closed control circuit designated generally as 40 is affixed to the outer barrel in fluid-tight communication therewith and provides a fluid flow path from the fluid port 35 to the fluid port 33 through a control valve 42 and a throttling valve 43. The control valve 42 is connected into the fluid flow line by means of fluid conduit or pipes 44 and 45 connected to opposite sides of the valve. The throttle valve is similarly connected in the fluid flow path by having connected at one side thereof the pipe 45 extending from the control valve. Fittings at the opposite side of the throttle valve extend to the fluid port 33. The pipe 44 is connected by a union 47 and nipple 48 into the elbow 36 and is thus in fluid communication with the fluid port 35. The throttle valve 43 is a valve of a type well known to the art which allows controlled amounts of fluid to pass therethrough in order to regulate the rate of flow through the fluid flow circuit 40. The control valve 42 is also of the type well known to the art and is essentially a 3-position valve which at the first position allows fluid flow through the circuit, that is, from the port 35 through the valve 42 and through the throttling valve 43 into the fluid port 33. At the second position of the valve 42 the port 35 is closed while the port 33 is opened to exhaust to the atmosphere. At the third position of the valve, fluid is allowed to flow into the valve through the line 44 and outward from the valve through a vent 41 to the atmosphere.

Referring now particularly to FIGURES 3 through 5, the inner barrel 21 is also an elongate cylindrical body having an outside diameter 50 which is substantially less than the inside diameter 51 of the outer barrel. The inner barrel extends in length from the outer end 52 thereof to the inner end 53. The inner end is adapted to be affixed to the nipple 55 which is in turn affixed to the service valve E. In the illustrative embodiment the inner barrel is attached to the valve nipple 55 by means of an adapter 56 which has female threads 57 mateable with the male threads 58 at the inner end of the barrel. A union 60 is utilized to join the adapter 56 to the nipple 55 of the service valve. Suitable sealing means such as an O-ring or square packing 61 are provided between the adapter 56 and the valve nipple 55 to provide a fluid-tight connection of the inner barrel with the nipple 55 and service valve E. Thus, the inner barrel 21 of the retriever is fixed with respect to the service valve E and extends outward from the nipple 55. As shown in the figures, the outer diameter 50 of the inner barrel 21 and the inner diameter 51 of the outer barrel 20, provide an annular space 70 which is a fluid containing volume as described more fully hereinafter. The inner barrel and outer barrel are slidably movable relative to one another and suitable packing means are provided proximate each end of the annular space 70 to form fluid-tight seals to define the annular space 70 as a fluid-tight volume during the sliding movement of the inner barrel with respect to the outer barrel. To this end there is provided proximate the inner end of the outer barrel a chevron packing unit 71 which is maintained in position by means of a threaded packing gland 72 at the inner side of the chevron seal 71 and a lantern ring 75 at the outer side of the chevron packing 71. The packing gland 72 is threadably mateable with the inside diameter of the outer barrel, and is locked into threaded engagement by means of a set screw 76. A fluid flow port 35' is provided through the lantern ring 75 in register with the fluid port 35. The fluid port 35' is obtained by providing a plurality of openings at circumferential intervals, with the openings joined by circumferential grooves. Thus, fluid will be passed through the lantern ring to the port 35 regardless of the circumferential orientation of the lantern ring. Thus, the lantern ring 75, the chevron packing 71 and the packing gland 72 are affixed to the outer barrel and the inner barrel is slidably movable with respect to these units. It can be seen that by turning down the packing gland 72 a compressive force can be exerted upon the chevron packing 71 to assure a fluid-tight seal between the chevron packing and the surfaces of the outer and inner barrels respectively. The set screw 76 is then turned onto the packing gland 72 when the proper amount of compression is achieved.

A similar fluid sealing unit is provided between the inner and outer barrels at the outer end of the inner barrel. At this sealing unit the chevron packing is affixed to the inner barrel and the sealing unit also furnishes a fluid seal between the inner barrel and the mandrel. Thus, as shown particularly in FIGURE 4, the chevron packing 80 is positioned between the inner and outer barrels by means of an annular sealing ring 81 which defines a shoulder 82 in contact with the inner end of the chevron 80. A packing gland 83 is threadably mated with the annular ring 81 such that it can be turned toward the chevron ring to exert a compressive force between the shoulder 84 thereof and the chevron packing to compress the packing between the shoulders 82 and 84 in order to obtain the required amount of sealing engagement between the inner diameter 51 of the outer barrel and the inner barrel to which the chevron packing is affixed. A third chevron packing 85 is provided at the inner diameter of the annular ring 81, which chevron packing 85 is in fluid sealing contact with the outer diameter 90 of the mandrel. A packing gland 86 is threadably engaged with a female thread of the annular ring 81 such that the chevron packing is compressed between a shoulder 87 formed at the inside diameter of the annular ring and the shoulder 88 defined by the packing gland 86. Thus, the chevron packings 80 and 85 can be compressed into the proper sealing engagement by rotating the packing glands 83 and 86 respectively, after which the glands are locked into place by means such as set screws 88.

Thus, the various sealing units including the chevron packings 71, 80 and 85 provide fluid sealing contact between the various components of the retriever apparatus. That is, the chevron packing 71 provides a fluid seal between the outer diameter of the inner barrel and the inner diameter of the outer barrel. The chevron packing is affixed to the outer barrel such that the outer surface of the inner barrel is slidably movable with respect thereto. The chevron packing 80 similarly provides a seal between the inner and outer barrel but is affixed to the inner barrel such that it is slidably movable with respect to the inner surface of the outer barrel. Likewise, the chevron packing 85 is affixed to the inner barrel and is in sliding sealing engagement with the outer surface of the mandrel. Thus, it can be seen by reference to FIGURES 3 and 4 that the fluid annulus 70 is defined by the inner surface of the outer barrel, the outer surface of the inner barrel, and the forward shoulder 90 at one end of the annulus and the rearward shoulder 91 at the opposite end of the annulus.

As shown particularly in FIGURES 3 and 4, the mandrel has a substantially lesser outside diameter than the inside diameter of the inner barrel with which it is relatively movable. That is, the outside diameter 92 of the mandrel is substantially less than the inside diameter 93 of the inner barrel such that a fluid annulus 95 is provided therebetween. This annulus extends throughout the length of the retriever to a rearward surface defined by the annular ring 81 which is affixed to the inner barrel and in sliding contact with the outer surface of the mandrel. Thus, fluid contained within the annulus 95 will exert a rearward force against the shoulders 96 and 96' of the annular ring.

A fluid flow port 100 is provided through the wall of the inner barrel 21 such that the annulus 95 is in fluid communication with the annulus 70. Accordingly, as shown in FIGURE 3, a fluid flow path exists through an opening 101 extending longitudinally through the retrieving tip and pilot rod and from the opening through radial openings 102 in the pilot rod to the interior of the valve body. From the valve body the fluid passing through the access fitting and pilot rod passes directly into the annular space existing between the mandrel and the inner barrel. From the annulus 95 the fluid then passes into the annulus 70 such that a fluid pressure exists in the annulus 70 which is substantially equal to that pressure existing in the annulus 95 and upon the cross-sectional area of the mandrel 22. That is, when fluid under pressure can pass from the pressure vessel A through the access fitting, the cross-sectional area of the mandrel will be subjected to such pressure and a rearwardly directed force will be exerted thereon as shown particularly in FIGURE 2.

Referring now to FIGURE 4 and FIGURE 3, the mandrel 22 is affixed to the outer barrel 20 at the rearward end thereof by suitable means. In the presently preferred embodiment an opening 110 is provided through the rear wall 111 of the outer barrel. The opening is substantially less in diameter than the diameter of the mandrel, and the mandrel is reduced at its rearward end by an amount sufficient to obtain a rearward portion 112 of the mandrel which is mateable with the opening 110. The end 113 of the mandrel is male threaded to receive a suitable fastening means such as the nut 114 which is threadedably engaged therewith and locked into place by a locking means 115. When the mandrel is affixed to the outer barrel at the rear wall 111 thereof a shoulder 116 defined at the reduction of the mandrel diameter is in bearing contact with the inner surface 132 of the rear wall 111 of the outer barrel. Suitable locking means such as a key 120 is inserted into a mateable groove 121 to prevent relative rotation between the mandrel and the outer barrel. Sealing means such as an O-ring or square packing 122 are provided between the surface of the outer barrel and the surface of the mandrel to assure fluid-tight engagement therebetween.

Thus, the outer barrel and mandrel are affixed one to the other in both longitudinal and rotational engagement. The mandrel and outer barrel are accordingly longitudinally and slidably movable with respect to the inner barrel which is stationary. The fluid port 33 described hereinbefore is positioned through the wall of the outer barrel at a longitudinal location just forward of the rear wall 117 of the outer barrel. Accordingly, the fluid port is in communication with the rearward surface of the annular ring 81 which is affixed to the inner barrel 21. The annular ring 81 thus has rearwardly facing shoulders 130, 131 and 132 which in cross-sectional area are equal to a single annular shoulder with an inside radius substantially equal to the radius of the mandrel and an outside radius substantially equal to the inside radius of the outer barrel. Thus, it may be seen that fluid passing through the fluid port 33 will exert a forwardly directed pressure on the shoulders 132, 131 and 130 of the inner barrel and the corresponding opposed shoulder 117—118 of the outer barrel to urge the outer barrel away from the rearward end of the inner barrel. Thus, if fluid under pressure is admitted into the chamber 140 the force exerted by the pressure will tend to move the outer barrel rearward and thus to move the retriever to the extended position shown in FIGURE 2 at which the fitting has been removed from the pressure vessel A and pulled rearward through the control valve E. To the contrary, pressure existing in the annulus 95 between the mandrel and inner barrel, and the annulus 70 between the inner barrel and the outer barrel will exert a force upon the shoulder 90 affixed to the outer barrel and against the shoulder 91 affixed to the inner barrel such that such force tends to separate the two shoulders longitudinally by moving the shoulder 90 forward. That is, since the shoulder 91 is stationary, the force exerted against the shoulders 91 and 90 will tend to separate the shoulders and thus cause the outer barrel to be moved in the forward direction. The forwardly directed force will be equal to the pressure of the fluid exerted upon the movable shoulder 90 which is an annular surface with an inside diameter substantially equal to the outside diameter of the inner barrel and an outside diameter substantially equal to the inside diameter of the outer barrel.

Accordingly, three pressure areas are of interest in the retriever in accordance with the present invention. The first is the cross-sectional area of the mandrel which will be subjected to the rearwardly directed force of the fluid contained in the vessel A. The second pressure area of interest is that defined by the shoulder 90 which when subjected to pressure will tend to move to the outer barrel forward with respect to the inner barrel. The third pressure area is that existing at the shoulders 117—118 at the rearward end of the outer barrel, which force is exerted to move the outer barrel rearward with respect to the stationary inner barrel. In the present invention the annular area of the shoulder 90 is substantially greater than the transverse cross-sectional area of the mandrel 22, while the transverse cross-sectional area of the shoulder 117—118 is substantially greater than the annular surface area of the shoulder 90. Thus, if fluid at equal pressures is admitted to the annulus 70 and to the annular space 140, the greater surface area of the rear chamber defined by the shoulder 117—118 at the rear face of the outer barrel will cause the outer barrel to be moved rearwardly with respect to the inner barrel since the force exerted at the greater area 117—118 is sufficient to overcome the force exerted at the shoulder 90 in the opposite direction. If, however, the pressure is removed from the annulus 140 while being retained in the annulus 95 and the annulus 70, the pressure exerted against the shoulder 90 will cause the outer barrel to be moved forward, since the total force in the forward direction is greater than the force acting upon the mandrel in the rearward direction.

The operation of the apparatus of the present invention has been discussed hereinabove in connection with various portions thereof. To summarize, however, the complete operation of the apparatus, such apparatus is in the collapsed position when the pilot rod has been moved through the service valve E as shown in FIGURES 1 and 3 and is in the extended position when the outer barrel and mandrel have been moved to the rearward position with respect to the inner barrel (FIGURE 2).

Thus, referring now to FIGURE 2, with the apparatus in the extended position and with the service valve E closed, the inner barrel 21 is affixed by means of the wing nut union G to the nipple F and valve E. After the fluid-tight connection has been made the valve E is opened and pressure from the vessel or casing A will pass to the apparatus. The fluid under pressure will flow through the longitudinal opening 101 in the pilot rod and through openings 102 to the annular space 95 between the mandrel and inner barrel. The fluid then passes into the annulus 70 through the fluid port 100 and thence to the control valve 42. At this extended position the annular ring 81 is at the position as shown in FIGURE 4. The control valve 42 is then moved to the closed position at which no fluid passes therethrough to the port 33. The fluid pressure will then be exerted upon the shoulder 90 and will force the outer barrel and mandrel to the left in the figures and thus to the collapsed position to move the pilot rod through the valve E. During this movement, as discussed hereinbefore, the port 33 is opened to exhaust through the valve 42. It should be noted that in passing to exhaust the air or fluid within the chamber 140 is passed through the throttle valve 43. Since the fluid contained in the chamber 140 must be exhausted to allow collapse, the rate of collapse can be governed by operation of throttle valve to restrict the rate of flow from the port 33. Additionally, the movement of the mandrel can be stopped at any point along its travel by closing the throttle valve. In this connection the chevron packings will act as a friction brake when expanded by pressure.

After the mandrel has reached the collapsed position, the retrieving tip is mated to the access plug or fitting to be removed or operating by rotating the outer barrel and mandrel. When the access fitting has been engaged the apparatus is operated to the extended position by turning the valve 42 to the position at which fluid passes from the port 35 through the valve 42, through the throttle valve 43 and into the annular space 140 through the port 33. The fluid under pressure is thus admitted to act upon the area 117—118 to move the outer barrel and mandrel rearward or to the right in the figures. As discussed hereinabove, the fluid pressure will cause this movement due to the larger area of the shoulder 117—118 relative to the shoulder 90. After the apparatus has been fully extended the service valve E is closed, the control valve 42 is moved to the exhaust position and the apparatus can be removed.

I claim:

1. A retrieving tool for operating and handling a fitting relative to a base releasably carrying the fitting and having a service valve thereon, said tool comprising, in combination: an outer barrel; an inner barrel, said inner barrel being longitudinally movable within said outer barrel, said inner barrel and said outer barrel defining a first longitudinally extending closed annular fluid tight chamber therebetween, said chamber being longitudinally bounded by a first end wall affixed to said inner barrel and a second end wall affixed to said outer barrel, said inner barrel being coupled in fluid tight connection to said service valve at the forward end of said inner barrel and defining a second fluid tight chamber in communication with said service valve and longitudinally extending from said valve to a forwardly facing end wall at the rearward end of said inner barrel; a mandrel within and extending through said inner barrel, said mandrel being affixed to said outer barrel and longitudinally movable therewith, the forward end of said mandrel being adapted to engage said fitting, said outer barrel and mandrel defining with said inner barrel a third fluid tight chamber, said third chamber having a first end wall affixed to said inner barrel and a second end wall affixed to said outer barrel; and fluid control means for directing fluid under pressure from said second chamber selectively to said first chamber and to said third chamber such that pressure within said first chamber exerts a force to move said outer barrel in one direction while pressure within said third chamber exerts a force to move said outer barrel in the opposite direction.

2. A retrieving tool for operating and handling a fitting relative to a base releasably carrying the fitting and having a service valve thereon, said tool comprising, in combination: an outer barrel; an inner barrel, said inner barrel being longitudinally and rotatably movable within said outer barrel, said inner barrel being coupled in fluid tight connection at the forward end thereof to said service valve, said inner barrel and said outer barrel defining a first longitudinally extending annular fluid tight chamber therebetween, said chamber being closed at the forward end thereof by a rearwardly facing first shoulder affixed to said outer barrel and at the rearward end thereof by a forwardly facing shoulder affixed to said inner barrel, said inner barrel defining a second fluid tight chamber in communication with said service valve; a mandrel within and extending through said inner barrel, said mandrel being affixed proximate the rearward end thereof to said outer barrel and longitudinally movable therewith, said mandrel being adapted to engage said fitting at the forward end of said mandrel; said outer barrel and mandrel defining with said inner barrel at the rearward end thereof a third fluid tight chamber closed at the forward end thereof by said inner barrel and at the rearward end thereof by a forwardly facing second shoulder affixed to said outer barrel; and fluid control means for directing fluid under pressure from said second chamber selectively to said first and third chambers.

3. A retrieving tool for operating and handling a fitting relative to a base releasably carrying the fitting and having a service valve thereon, said tool comprising, in combination: an outer barrel; an inner barrel, said inner barrel being longitudinally and rotatably movable within said outer barrel, said inner barrel being coupled in fluid tight connection at the forward end thereof to said service valve, said inner barrel and said outer barrel defining a first longitudinally extending annular fluid tight chamber therebetween, said chamber being closed at the forward end thereof by a rearwardly facing first shoulder affixed to said outer barrel and at the rearward end thereof by a forwardly facing shoulder affixed to said inner barrel, said first shoulder having a first predetermined transverse area, said inner barrel defining a second fluid tight chamber in communication with said service valve; a mandrel within and extending through said inner barrel, said mandrel being affixed proximate the rearward end thereof to said outer barrel and longitudinally movable therewith, said mandrel having a second predetermined transverse area less than said first predetermined transverse area, said mandrel being adapted to engage said fitting at the forward end of said mandrel; said outer barrel and said inner barrel at the rearward end thereof a third fluid tight chamber closed at the forward end thereof by said inner barrel and at the rearward end thereof by a forwardly facing second shoulder affixed to said outer barrel, said second shoulder having a third predetermined transverse area greater than said first predetermined transverse area; and fluid control means for directing fluid under pressure from said second chamber selectively to said first and third chambers.

4. A retrieving tool for operating and handling a fitting relative to a base releasably carrying the fitting and having a service valve thereon, said tool comprising, in combination: an outer barrel; an inner barrel, said inner barrel being longitudinally and rotatably movable within said outer barrel, said inner barrel being coupled in fluid tight connection at the forward end thereof to said service valve, said inner barrel and said outer barrel defining a first longitudinally extending annular fluid tight chamber therebetween, said chamber being closed at the forward end thereof by a rearwardly facing first shoulder affixed to said outer barrel and at the rearward end thereof by a forwardly facing shoulder affixed to said inner barrel, said first shoulder having a first predetermined transverse area, said inner barrel defining a second fluid tight chamber in communication with said service valve; a mandrel within and extending through said inner barrel, said mandrel being affixed proximate the rearward end thereof to said outer barrel and longitudinally movable therewith, said mandrel having a second predetermined transverse area less than said first predetermined transverse area, said mandrel being adapted to engage said fitting at the forward end of said mandrel; said outer barrel and mandrel defining with said inner barrel at the rearward end thereof a third fluid tight chamber closed at the forward end thereof by said inner barrel and at the rearward end thereof by a forwardly facing second shoulder affixed to said outer barrel, said second shoulder having a third predetermined transverse area greater than said first predetermined transverse area; and fluid control means for directing fluid from said second chamber to said first chamber and selectively from said second to said third chamber.

5. A retrieving tool for operating and handling a fitting relative to a base releasably carrying the fitting and having a service valve thereon, said tool comprising in combination: an outer barrel; an inner barrel, said inner barrel being longitudinally and rotatably movable within said outer barrel, said inner barrel being connected at the forward end thereof to said service valve, said inner barrel and said outer barrel defining a first longitudinally extending annular fluid tight chamber therebetween, said chamber being closed at the forward end thereof by a rearwardly facing first shoulder affixed to said outer barrel and at the rearward end thereof by a forwardly facing shoulder affixed to said inner barrel, said first shoulder having a first predetermined transverse area, said inner barrel defining a second fluid tight chamber in communication with said service valve; a mandrel within and extending through said inner barrel, said mandrel being affixed proximate the rearward end thereof to said outer barrel and longitudinally movable therewith, said mandrel having a second predetermined transverse area less than said first predetermined transverse area, said mandrel adapted to engage said fitting at the forward end of said mandrel; said outer barrel and mandrel defining with said inner barrel at the rearward end thereof a third fluid tight chamber closed at the forward end thereof by said inner barrel and at the rearward end thereof by a forwardly facing second shoulder affixed to said outer barrel, said second shoulder having a third predetermined transverse area greater than said first predetermined transverse area; and, fluid control means including a first fluid port interconnecting said first chamber and said second chamber, a fluid conduit defining a fluid path from said first chamber to said third chamber, and valve means in said conduit for selectively opening said fluid path between said first and third chambers.

6. A retrieving tool for operating and handling a fitting relative to a base releasably carrying the fitting and having a service valve thereon, said tool comprising in combination: an outer barrel; an inner barrel, said inner barrel being longitudinally and rotatably movable within said outer barrel, said inner barrel being connected at the forward end thereof to said service valve, said inner barrel and said outer barrel defining a first longitudinally extending annular fluid tight chamber therebetween, said chamber being closed at the forward end thereof by a rearwardly facing first shoulder affixed to said outer barrel and at the rearward end thereof by a forwardly facing shoulder affixed to said inner barrel, said first shoulder having a first predetermined transverse area, said inner barrel defining a second fluid tight chamber in communication with said service valve; a mandrel within and extending through said inner barrel, said mandrel being affixed proximate the rearward end thereof to said outer barrel and longitudinally movable therewith, said mandrel having a second predetermined transverse area less than said first predetermined transverse area, said mandrel adapted to engage said fitting at the forward end of said mandrel, said outer barrel and mandrel defining with said inner barrel at the rearward end thereof a third fluid tight chamber closed at the forward end thereof by said inner barrel and at the rearward end thereof by a forwardly facing second face affixed to said outer barrel, said second shoulder having a third predetermined transverse area greater than said first predetermined transverse area; and, fluid control means including a first fluid port interconnecting said first chamber and said second chamber, a fluid conduit defining a fluid path from said first chamber to said third chamber, and valve means in said conduit, said valve means including a control valve for selectively opening said fluid path from said first to said third chambers and for venting said chambers to the atmosphere.

7. The apparatus as defined in claim 6 in which a throttle valve is positioned in said fluid conduit to regulate the rate of fluid flow therethrough.

References Cited in the file of this patent

UNITED STATES PATENTS

| | | |
|---|---|---|
| 1,956,129 | Mueller | Apr. 24, 1934 |
| 2,646,699 | Mueller | July 28, 1953 |
| 2,744,310 | Gould | May 8, 1956 |
| 2,829,429 | Mueller | Apr. 8, 1958 |